(12) United States Patent
Ramaswamy et al.

(10) Patent No.: US 9,969,297 B2
(45) Date of Patent: *May 15, 2018

(54) IN-SERVICE FUEL CELL PERFORMANCE RECOVERY

(71) Applicant: AUDI AG, Ingolstadt (DE)

(72) Inventors: Sitaram Ramaswamy, West Hartford, CT (US); Venkateshwarlu Yadha, Richardson, TX (US); Matthew P. Wilson, Groton, CT (US)

(73) Assignee: Audi AG, Ingolstadt (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/195,849

(22) Filed: Jun. 28, 2016

(65) Prior Publication Data

US 2016/0303994 A1    Oct. 20, 2016

Related U.S. Application Data

(63) Continuation of application No. 13/261,615, filed as application No. PCT/US2010/002503 on Sep. 15, 2010, now Pat. No. 9,403,444.

(51) Int. Cl.
*B60L 11/18* (2006.01)
*B60L 3/00* (2006.01)
(Continued)

(52) U.S. Cl.
CPC ......... *B60L 11/1883* (2013.01); *B60L 3/0053* (2013.01); *B60L 11/1881* (2013.01);
(Continued)

(58) Field of Classification Search
CPC ............. B60L 11/1883; B60L 11/1881; B60L 3/0053; H01M 8/04223; H01M 8/04619; H01M 8/0488
See application file for complete search history.

(56) References Cited

U.S. PATENT DOCUMENTS

2001/0053950 A1    12/2001 Hasegawa et al.
2002/0182456 A1*  12/2002 Condit .............. H01M 8/04223
                                                             429/436
(Continued)

FOREIGN PATENT DOCUMENTS

JP    2001-307758 A    11/2001
WO   2008/066547 A1    6/2008

OTHER PUBLICATIONS

International Search Report, dated May 30, 2011, for International Application No. PCT/2010/002503, 2 pages.

*Primary Examiner* — Khoi H Tran
*Assistant Examiner* — Kelly D Williams
(74) *Attorney, Agent, or Firm* — Seed IP Law Group LLP

(57) ABSTRACT

The performance of a fuel cell power plant that decays, in an electric vehicle which makes frequent starts, is recovered by partially shutting down the power plant. Recovery is enabled by a recovery enable flag upon conditions such as vehicle using low or no power, vehicle speed at or near zero, electric storage SOC above a threshold, and no recovery during the last half-hour (or other duration). The recovery restart resets a timer to ensure that recovery is not attempted too often. The power plant then remains in a recovery stand-by mode until a recovery restart flag is set to 1. The restart causes start-up of the fuel cell power plant, reaching an operational mode.

19 Claims, 4 Drawing Sheets

(51) Int. Cl.
| | | |
|---|---|---|
| *H01M 8/04223* | (2016.01) | |
| *H01M 8/04537* | (2016.01) | |
| *H01M 8/04858* | (2016.01) | |
| *H01M 8/04225* | (2016.01) | |
| *H01M 8/04228* | (2016.01) | |
| *H01M 8/04746* | (2016.01) | |
| *H01M 8/04955* | (2016.01) | |
| *H01M 10/44* | (2006.01) | |
| *H01M 10/46* | (2006.01) | |
| *H01M 16/00* | (2006.01) | |

(52) U.S. Cl.
CPC ....... *B60L 11/1887* (2013.01); *B60L 11/1888* (2013.01); *H01M 8/0488* (2013.01); *H01M 8/04223* (2013.01); *H01M 8/04225* (2016.02); *H01M 8/04228* (2016.02); *H01M 8/04619* (2013.01); *H01M 8/04753* (2013.01); *H01M 8/04955* (2013.01); *H01M 10/44* (2013.01); *H01M 10/46* (2013.01); *H01M 16/006* (2013.01); *B60L 2240/12* (2013.01); *B60L 2240/80* (2013.01); *B60L 2260/22* (2013.01); *H01M 2220/20* (2013.01); *H01M 2250/20* (2013.01); *Y02E 60/50* (2013.01); *Y02T 10/92* (2013.01); *Y02T 90/32* (2013.01); *Y02T 90/34* (2013.01)

(56) References Cited

U.S. PATENT DOCUMENTS

| | | |
|---|---|---|
| 2006/0003205 A1 | 1/2006 | Yoshida et al. |
| 2007/0015016 A1* | 1/2007 | Aoyama ............ B60L 11/1881 429/429 |
| 2009/0098427 A1* | 4/2009 | Reiser ............... H01M 8/04089 429/415 |
| 2009/0208796 A1* | 8/2009 | Matsuo ............ H01M 8/04029 429/429 |

* cited by examiner

IN-SERVICE FUEL CELL PERFORMANCE RECOVERY

CROSS-REFERENCE TO RELATED APPLICATION

This application is a continuation of U.S. patent application Ser. No. 13/261,615, filed Mar. 12, 2013, which is a 371 of international Application No. PCT/US2010/002501, filed Sep. 15, 2010, where each application is incorporated by reference in its entirety.

TECHNICAL FIELD

Decayed performance of a fuel cell power plant operating a vehicle which frequently pauses, such as a bus, is restored (recovered) periodically throughout the time that the vehicle is in-service, the recovery occurring at times when the vehicle is stopped (idling).

BACKGROUND ART

Typical hybrid power plants for a city bus include a combination power source that includes a battery pack and more recently a fuel cell stack. However, the fuel cell stacks which provide electric power for operating buses sustain daily decay in performance (voltage as a function of current density). Performance is recovered at the end of each day's service as part of a fuel cell power plant shutdown procedure. The performance of a fuel cell that provides motive power to a city bus is illustrated for the beginning of the day in the upper curve of FIG. 1 and at the end of a nine-hour day in the lower curve of FIG. 1.

SUMMARY

It has been learned that the majority of daily performance decay in fuel cell stacks providing electric power to operate city buses occurs within the first hour of operation of the fuel cell stack. This means that such fuel cell stacks are less efficient, and have lower voltage and lower power, most of the day.

In order to provide substantially maximum performance of a fuel cell stack powering a bus or other vehicle which makes frequent stops, a performance recovery procedure is carried out periodically upon one or more conditions, such as the average electric power produced in a recent interval being less than a threshold, the vehicle speed being less than a threshold level, the battery state of charge exceeding a threshold level, and the in-service performance recovery procedure not having been provided within a previous period of time, such as one-half of an hour. When performance recovery is enabled, the fuel cell power plant is partially shut down, by removing the load and connecting the stack to voltage limiting devices, stopping the flow of air to the cathodes, and stopping the flow of fuel. However, the temperature management system (coolant flow) remains in operation. The system will then hold, in a performance recovery standby mode, until there is an indication that the fuel cell power plant should resume normal operation, e.g., the bus begins to move, demanding power, or the energy storage device needs charging.

In order to leave the performance recovery standby mode and restart the production of electricity by the fuel cell power plant, a recovery restart flag must be present. The routine which may generate this flag is performed, automatically, several times a minute. This flag is generated, for example, whenever the average power consumption of the vehicle drive system over a recent period, such as a minute, is greater than a threshold amount of power, or the vehicle speed exceeds a speed threshold amount, or the state of charge of the battery (or other electric storage device) is low enough to require recharging.

The processes herein may be used with vehicles other than buses, such as package delivery trucks.

Other variations will become more apparent in the light of the following detailed description of exemplary embodiments, as illustrated in the accompanying drawings.

MODE(S) OF IMPLEMENTATION

Figure 1:
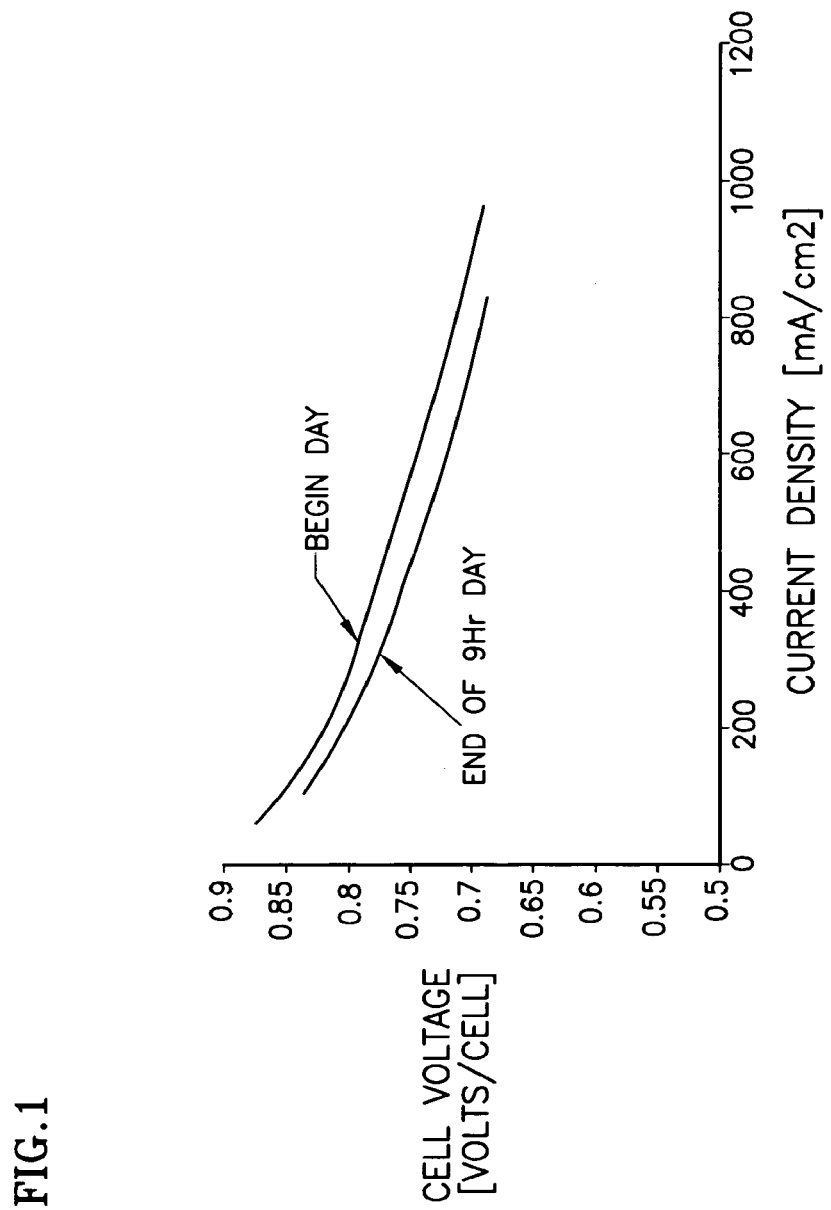
FIG. 1 is a chart of fuel cell stack performance at the beginning of the day and at the end of a nine-hour day.
Figure 2:
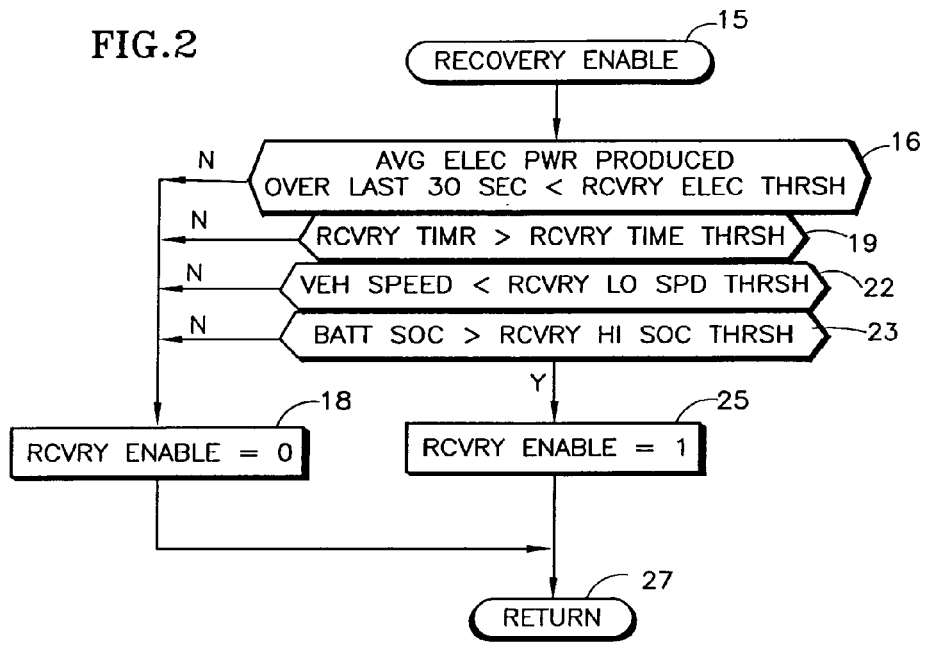
FIG. 2 is a functional diagram illustrating the selective generation of a recovery enable flag.
Figure 3:
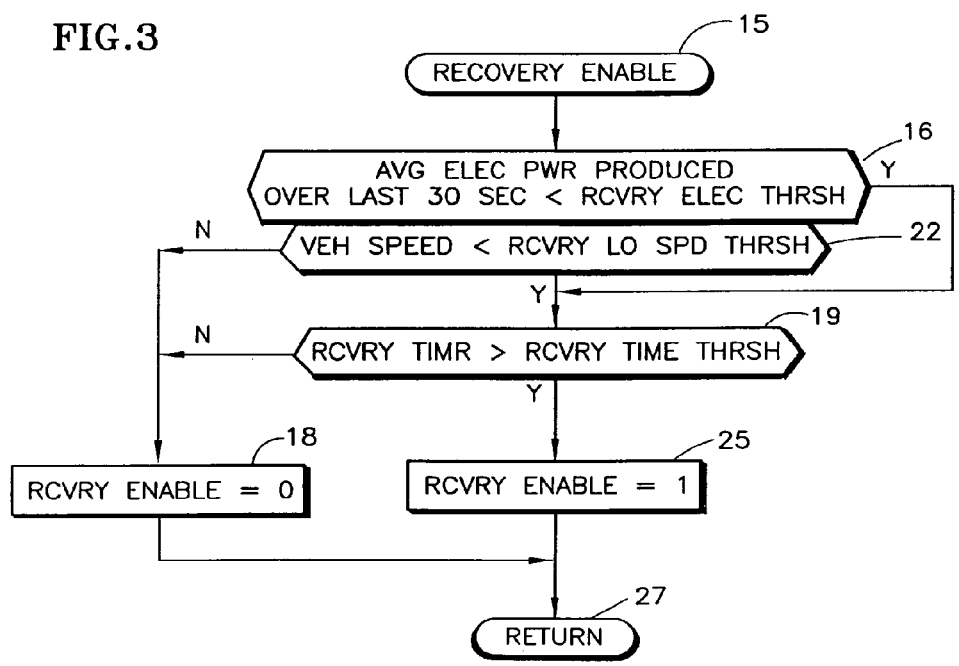
FIG. 3 is a functional description of an alternative method of generating a recovery enable flag.
Figure 4:
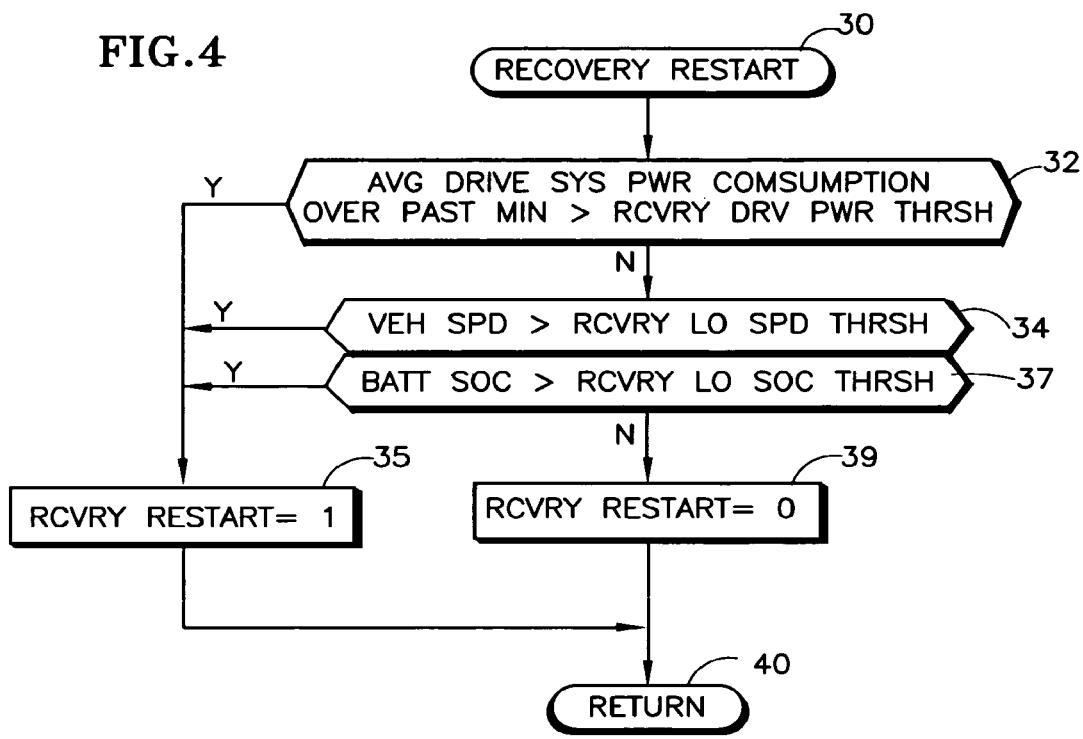
FIG. 4 is a functional description of a method for generating a recovery restart flag.

Conducting a performance recovery, and returning to normal fuel cell operation are both controlled by flags: a "recovery enable" flag and a "recovery restart flag", respectively. How these flags relate to the overall fuel cell control loop is described after the description of the flags themselves. Two alternative methods for generating the recovery enable flag are illustrated in FIGS. 2 and 3; an embodiment for generating the recovery restart flag is illustrated in FIG. 4. Each of these flag programs are run periodically, such as three or four times per minute. The recovery enable flag, once set to a 1, will cause performance recovery to commence almost immediately. When performance recovery has been accomplished, the recovery restart flag will be provided only when the vehicle drive system demands more than a threshold amount of power, or the vehicle speed exceeds a low threshold amount, or the battery needs recharging. Until one of these events occurs, the fuel cell system waits in a recovery standby mode.

Referring to FIG. 2, a recovery enable routine is reached through an entry point 15 and a first test 16 determines whether the average electric power produced over a recent period, such as 30 seconds, is less than a recovery electric threshold, which may, by way of example, be about 5 kilowatts. If that is not the case, a negative result of test 16 reaches a step 18 in which the recovery enable flag is set to zero. But if test 16 is affirmative, a test 19 is reached to determine if a recovery timer, which is reset at the end of each recovery procedure, has reached a time threshold, such as about 30 minutes, or such as other time as is deemed suitable in any particular utilization, as a function of the nature and condition of the fuel cell itself and the drive cycle expected of the vehicle being powered. If test 19 is negative, the recovery enable flag is set to zero in step 18.

If test 19 is affirmative, a test 22 determines if the vehicle speed is less than a recovery low speed threshold, which may be on the order of 0.1 miles per hour. If test 22 is negative, the step 18 will set the recovery enable flag to zero. If test 22 is affirmative, a test 23 will determine if the battery state of charge is greater than a recovery high state of charge threshold, which may be on the order of 40%. If test 23 is negative, step 18 will set the recovery enable flag to zero, but if test 23 is affirmative, all of the tests 16-23 being affirmative, the recovery enable flag is set to 1 in a step 25. Then other programming is reverted to through a return point 27.

The embodiment of FIG. 2 requires that all four conditions be met before recovery enable can be set. However, in any given implementation, less than all four may be utilized, and other conditions may be utilized as well.

FIG. 3 illustrates a variation of the embodiment of FIG. 2 which may be used as an alternative. In FIG. 2, if either test 16 or 22 is affirmative, indicating either low power utilization or low speed, then the test 19 can be reached, and if affirmative, will set enable recovery flag to 1 in step 25. But if both tests 16 and 22 are negative or if test 19 is negative, then the step 18 is reached to set recovery enable flag to 0. Other variations may be made in the conditions for establishing the recovery enable flag.

When performance recovery is accomplished, normal operation of the fuel cell power plant may be reestablished in response to a recovery restart flag, as is explained more fully with respect to FIG. 5, hereinafter. In FIG. 4, the routine for establishing the recovery restart flag is reached through an entry point 30, and a first test 32 determines if the average drive system power consumption over a recent time interval, such as one minute, exceeds a recovery drive power threshold. If it does, an affirmative result of test 32 reaches a step 35 to set the recovery restart flag to 1. If not, a test 34 determines if the vehicle speed exceeds a recovery low speed threshold. If so, the step 35 will set the recovery restart flag to 1. If not, a test 37 determines if the battery needs charging, by determining if the battery state of charge is less than a recovery low state of charge threshold. If so, the step 35 will set the recovery restart flag to 1. But if not, then all three tests 32, 34 and 37 are negative which will reach a step 39 in which the recovery restart flag is set equal to 0. Then, another program is reverted to through a return point 40.

The conditions in FIG. 4 to determine whether the fuel cell power plant should be restarted relate to the vehicle resuming motion, as indicated either by power consumption or speed in the tests 32 and 34 or simply that the battery needs charging and therefore the fuel cell power plant should be restarting.

An overall fuel cell power plant control loop utilizes the recovery enable flag and the recovery restart flag to control performance recovery of the fuel cell stack and to enable normal operation of the fuel cell power plant to be resumed when it is necessary either because the vehicle is moving or because of a need to charge the battery or other electric storage system.

Figure 5:
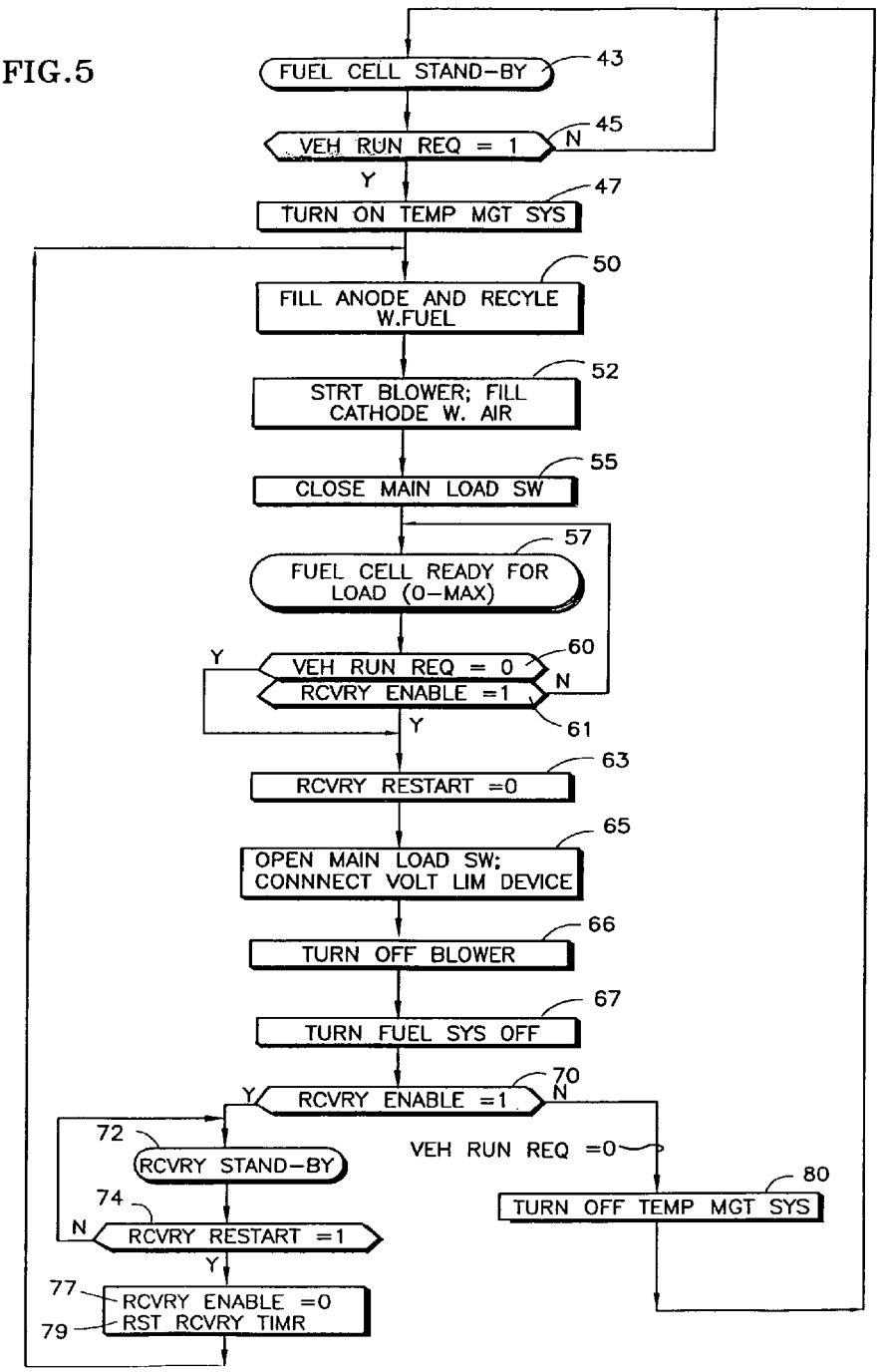
FIG. 5 is a functional diagram of a fuel cell power plant control loop, illustrating a process of partially shutting down the fuel cell stack to recover performance of the stack.

In FIG. 5, there are three fuel cell power plant modes, including standby 43, which is when the fuel cell is turned off and the controller of the fuel cell is waiting for a vehicle request for the fuel cell power plant to run, as determined in a test 45. To get the fuel cell power plant into operation, a first step may be to turn on the temperature management system in a step 47. On the other hand, depending upon other characteristics of the fuel cell power plant, not germane to the disclosure herein, the temperature management system may not be turned on until later in the operation, as needed, or to support reaching operating temperature, or for some other reason. A step 50 causes the anode and recycle plumbing to be filled with fuel. A step 52 causes the blower to be started filling the cathode with air. A step 55 causes the main load switch to be closed.

Following the steps 47-55, the fuel cell power plant is in a normal operation mode 57 where it is ready to supply any load from zero to maximum load. The fuel cell power plant is then responsive to whatever demand the vehicle makes for power. It will remain in the normal operation mode 57 until either the vehicle request for the fuel cell to run is changed to 0, as indicated in a test 60, or until the recovery enable flag is set to 1, as determined in a test 61. As long as both test 60 and 61 are negative, the fuel cell power plant remains in the normal operation mode 57 to deliver power demanded by the vehicle. If either the run request flag is 0 or the recovery enable flag is 1, then one of the tests 60, 61 will be affirmative reaching a step 63 which sets the recovery restart flag to 0 to ensure that the fuel cell power plant may be shut down if the vehicle run request is 0 (test 60) and to ensure that a restart will not occur until the recovery process is complete.

Recovery in this embodiment is achieved by the process of shutting down the fuel cell power plant (except for the temperature management system). This includes two steps 65 in response to which the main load switch is opened (disconnecting the load) and a voltage limiting device or devices are connected to the electrical output of the fuel cell power plant. A step 66 turns off the blower, so that with no air and the voltage limiting devices connected, the cathode potential is limited to being near hydrogen potential. Step 67 turns the fuel system off, so that the fuel cell power plant is shut down.

A test 70 determines whether the control loop has reached this stage as a result of the recovery enable flag being equal to 1 or as a result of the vehicle run request flag being 0. If test 70 is negative, then the shutdown is due to the vehicle run request being 0. But if test 70 is affirmative, the shutdown is as a result of a recovery being performed. An affirmative result of test 70 reaches a recovery standby mode 72 where the fuel cell power plant control loop will remain until the recovery restart flag is 1, as indicated by a test 74. So long as test 74 is negative, the fuel cell stack remains in the recovery stand-by mode 72. When the restart flag is set to 1, as described with respect to FIG. 4 hereinbefore, then the recovery enable flag is set to 0 in a step 77 and the recovery timer is reset, so as to indicate in test 19 of either FIG. 2 or FIG. 3 when the present recovery was carried out.

When leaving the recovery standby mode 72 following steps 77 and 79, the fuel cell power plant control loop reverts to the three steps 50, 52, 55 to establish operation of the fuel cell power plant and return it to the normal operation mode 57 where the fuel cell is ready for any load demand between zero and maximum.

Should step 70 be negative, indicating that the vehicle run request flag was set to 0, a step 80 will cause the temperature management system to be turned off so that the fuel cell power plant is totally shut down. This causes it to be in the fuel cell standby mode 43 as described hereinbefore, where it will remain until the vehicle requests it to run as indicated by test 45.

In this embodiment, the performance recovery is accomplished by the three steps 65-67 which reduce cathode potential. However, other embodiments not described herein fully may utilize other forms of recovery, including recycling cathode exhaust, providing hydrogen to the cathodes.

Since changes and variations of the disclosed embodiments may be made without departing from the concept's intent, it is not intended to limit the disclosure other than as required by the appended claims.

The invention claimed is:

1. A method of operating a fuel cell power plant that provides electric power to an electrically propelled vehicle, the method comprising:

recovering fuel cell stack performance when the electrically propelled vehicle is temporarily not moving and is demanding either a small amount of power or no power at all, and once fuel cell stack performance has been recovered, restoring normal operation of the fuel cell power plant in response to one or more conditions selected from a) a drive system of the electrically propelled vehicle consuming power in excess of a threshold amount, b) a vehicle speed exceeding a speed threshold, and c) an electric energy storage device which receives electric charge from the fuel cell power plant having a state of charge less than a threshold state of charge, wherein recovering the fuel cell stack performance comprises, in order, disconnecting the electrically propelled vehicle from an electric power output of the fuel cell power plant, connecting one or more voltage limiting devices to the electric power output of the fuel cell power plant, shutting off oxidant supply to cathodes of the fuel cell power plant, and shutting off fuel supply to anodes of the fuel cell power plant, and wherein coolant flows through the fuel cell power plant throughout the process of recovering fuel cell stack performance.

2. A method of operating a fuel cell power plant that provides electric power to an electrically propelled vehicle, the method comprising:

recovering fuel cell stack performance when the electrically propelled vehicle is temporarily not moving and is demanding either a small amount of power or no power at all, wherein recovering the fuel cell stack performance comprises, in order, disconnecting the electrically propelled vehicle from an electric power output of the fuel cell power plant, connecting one or more voltage limiting devices to the electric power output of the fuel cell power plant, shutting off oxidant supply to cathodes of the fuel cell power plant, and shutting off fuel supply to anodes of the fuel cell power plant, wherein coolant flows through the fuel cell power plant throughout the process of recovering fuel cell stack performance, and wherein recovering fuel cell stack performance is triggered by a recovery enable flag, the recovery enable flag being generated upon satisfaction of all of the following criteria:

average electric power produced by the fuel cell power plant over a recent period is less than a recovery electric threshold;

a recovery timer has reached a time threshold;

a speed of the electrically propelled vehicle is less than a recovery low speed threshold; and a battery state of charge is greater than a recovery high state of charge threshold.

3. The method of claim 2 wherein normal operation of the fuel cell power plant is reestablished in response to a recovery restart flag, the recovery restart flag being generated upon satisfaction of one or more of the following criteria:

an average drive system power consumption over a recent time interval exceeds a recovery drive power threshold;
a speed of the electrically propelled vehicle exceeds a recovery low speed threshold; and
a battery state of charge is less than a recovery low state of charge threshold.

4. The method of claim 3, further comprising:
upon generation of the recovery restart flag, resetting the recovery timer.

5. A method of operating a fuel cell power plant that provides electric power to an electrically propelled vehicle, the method comprising:

recovering fuel cell stack performance when the electrically propelled vehicle is temporarily not moving and is demanding either a small amount of power or no power at all, wherein recovering the fuel cell stack performance comprises, in order, disconnecting the electrically propelled vehicle from an electric power output of the fuel cell power plant, connecting one or more voltage limiting devices to the electric power output of the fuel cell power plant, shutting off oxidant supply to cathodes of the fuel cell power plant, and shutting off fuel supply to anodes of the fuel cell power plant, wherein coolant flows through the fuel cell power plant throughout the process of recovering fuel cell stack performance, and wherein recovering fuel cell stack performance is triggered by a recovery enable flag, the recovery enable flag being generated upon satisfaction of the following criteria:

average electric power produced by the fuel cell power plant over a recent period is less than a recovery electric threshold or a speed of the electrically propelled vehicle is less than a recovery low speed threshold; and
a recovery timer has reached a time threshold.

6. The method of claim 5 wherein normal operation of the fuel cell power plant is reestablished in response to a recovery restart flag, the recovery restart flag being generated upon satisfaction of one or more of the following criteria:

an average drive system power consumption over a recent time interval exceeds a recovery drive power threshold;
a speed of the electrically propelled vehicle exceeds a recovery low speed threshold; and
a battery state of charge is less than a recovery low state of charge threshold.

7. The method of claim 6, further comprising:
upon generation of the recovery restart flag, resetting the recovery timer.

8. A method of operating a fuel cell power plant that provides electric power to an electrically propelled vehicle, the method comprising:

recovering fuel cell stack performance when the electrically propelled vehicle is temporarily not moving and is demanding either a small amount of power or no power at all, and ensuring that normal operation of the fuel cell power plant will not be reestablished until after the recovery of the fuel cell stack performance is complete, wherein recovering the fuel cell stack performance comprises, in order, disconnecting the electrically propelled vehicle from an electric power output of the fuel cell power plant, connecting one or more voltage limiting devices to the electric power output of the fuel cell power plant, shutting off oxidant supply to cathodes of the fuel cell power plant, and shutting off fuel supply to anodes of the fuel cell power plant, and wherein coolant flows through the fuel cell power plant throughout the process of recovering fuel cell stack performance.

9. A method of operating a fuel cell power plant that provides electric power to an electrically propelled vehicle, the method comprising:
  recovering fuel cell stack performance when the electrically propelled vehicle is temporarily not moving and is demanding either a small amount of power or no power at all, and
  after the recovery of the fuel cell stack performance is complete, determining whether the recovery of the fuel cell stack performance was in response to a recovery enable flag or an absence of a vehicle run request flag,
  wherein recovering the fuel cell stack performance comprises, in order, disconnecting the electrically propelled vehicle from an electric power output of the fuel cell power plant, connecting one or more voltage limiting devices to the electric power output of the fuel cell power plant, shutting off oxidant supply to cathodes of the fuel cell power plant, and shutting off fuel supply to anodes of the fuel cell power plant, and
  wherein coolant flows through the fuel cell power plant throughout the process of recovering fuel cell stack performance.

10. A method comprising:
  when a vehicle, powered by electricity provided by a fuel cell power plant, is demanding little or no power from the fuel cell power plant, as indicated by a recovery enable flag, recovering fuel cell stack performance,
  wherein recovering fuel cell stack performance comprises, in order, disconnecting the vehicle from an electric power output of the fuel cell power plant, connecting one or more voltage limiting devices to the electric power output of the fuel cell power plant, shutting off oxidant supply to cathodes of the fuel cell power plant, and shutting off fuel supply to anodes of the fuel cell power plant, and
  wherein a flag program that can generate the recovery enable flag is run a plurality of times per minute during operation of the fuel cell power plant.

11. The method according to claim 10, further comprising:
  once fuel cell stack performance has been recovered, restoring normal operation of the fuel cell power plant in response to one or more conditions selected from a) a drive system of the vehicle consuming power in excess of a threshold amount, b) a vehicle speed exceeding a speed threshold, and c) an electric energy storage device which receives electric charge from the fuel cell power plant having a state of charge less than a threshold state of charge.

12. The method of claim 10 wherein the recovery enable flag is generated upon satisfaction of all of the following criteria:
  average electric power produced by the fuel cell power plant over a recent period is less than a recovery electric threshold;
  a recovery timer has reached a time threshold;
  a speed of the vehicle is less than a recovery low speed threshold; and
  a battery state of charge is greater than a recovery high state of charge threshold.

13. The method of claim 12 wherein normal operation of the fuel cell power plant is reestablished in response to a recovery restart flag, the recovery restart flag being generated upon satisfaction of one or more of the following criteria:
  an average drive system power consumption over a recent time interval exceeds a recovery drive power threshold;
  a speed of the vehicle exceeds a recovery low speed threshold; and
  a battery state of charge is less than a recovery low state of charge threshold.

14. The method of claim 13, further comprising:
  upon generation of the recovery restart flag, resetting the recovery timer.

15. The method of claim 10 wherein the recovery enable flag is generated upon satisfaction of the following criteria:
  average electric power produced by the fuel cell power plant over a recent period is less than a recovery electric threshold or a speed of the vehicle is less than a recovery low speed threshold; and
  a recovery timer has reached a time threshold.

16. The method of claim 15 wherein normal operation of the fuel cell power plant is reestablished in response to a recovery restart flag, the recovery restart flag being generated upon satisfaction of one or more of the following criteria:
  an average drive system power consumption over a recent time interval exceeds a recovery drive power threshold;
  a speed of the vehicle exceeds a recovery low speed threshold; and
  a battery state of charge is less than a recovery low state of charge threshold.

17. The method of claim 16, further comprising:
  upon generation of the recovery restart flag, resetting the recovery timer.

18. The method of claim 10, further comprising:
  ensuring that normal operation of the fuel cell power plant will not be reestablished until after the recovery of the fuel cell stack performance is complete.

19. The method of claim 10, further comprising:
  after the recovery of the fuel cell stack performance is complete, determining whether the recovery of the fuel cell stack performance was in response to a recovery enable flag or an absence of a vehicle run request flag.

* * * * *